United States Patent
Yaguchi et al.

(10) Patent No.: US 12,230,418 B2
(45) Date of Patent: Feb. 18, 2025

(54) COMPOSITE CABLE

(71) Applicant: Hitachi Metals, Ltd., Tokyo (JP)

(72) Inventors: Atsuro Yaguchi, Tokyo (JP); Detian Huang, Tokyo (JP); Takanobu Watanabe, Tokyo (JP); Kotaro Tanaka, Tokyo (JP); Kimika Kudo, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 17/945,945

(22) Filed: Sep. 15, 2022

(65) Prior Publication Data
US 2023/0102030 A1 Mar. 30, 2023

(30) Foreign Application Priority Data
Sep. 28, 2021 (JP) .................. 2021-158111

(51) Int. Cl.
| | |
|---|---|
| H01B 11/04 | (2006.01) |
| H01B 3/30 | (2006.01) |
| H01B 11/02 | (2006.01) |
| H01B 11/18 | (2006.01) |
| H01B 11/20 | (2006.01) |

(52) U.S. Cl.
CPC ............. H01B 11/20 (2013.01); H01B 3/30 (2013.01); H01B 11/02 (2013.01); H01B 11/1808 (2013.01)

(58) Field of Classification Search
CPC .......... H01B 7/04; H01B 7/0045; H01B 7/17; H01B 9/003; H01B 11/04
See application file for complete search history.

(56) References Cited

U.S. PATENT DOCUMENTS

| | | | | |
|---|---|---|---|---|
| 9,390,842 B2* | 7/2016 | Hayashishita | ......... | H01B 13/34 |
| 9,865,374 B1* | 1/2018 | Hayashishita | ........... | H01B 7/02 |
| 10,043,599 B2* | 8/2018 | Hayashishita | ......... | H01B 1/026 |
| 2013/0343713 A1* | 12/2013 | Hayashishita | ....... | G02B 6/4434 385/103 |
| 2015/0371738 A1* | 12/2015 | Buck | .................. | H01B 11/1895 174/103 |
| 2017/0110221 A1* | 4/2017 | Wu | ........................ | H01B 11/20 |
| 2018/0151272 A1* | 5/2018 | Watanabe | .......... | A61B 1/00114 |
| 2019/0074110 A1* | 3/2019 | Niwata | .................. | H01B 3/306 |

FOREIGN PATENT DOCUMENTS

| | | | |
|---|---|---|---|
| JP | 2014-143015 | * | 8/2014 |
| JP | 2019-029262 A | | 2/2019 |

\* cited by examiner

*Primary Examiner* — Chau N Nguyen
(74) *Attorney, Agent, or Firm* — MCGINN I.P. LAW GROUP, PLLC

(57) ABSTRACT

A composite cable is provided with a coaxial wire and an insulated wire. The coaxial wire includes a center conductor, a first insulation covering the center conductor, and plural outer conductors arranged on an outer periphery of the first insulation, and a jacket covering the plural outer conductors. The insulated wire includes a stranded conductor including plural strands twisted together, and a second insulation covering the stranded conductor. The center conductor of the coaxial wire is a single wire. A conductor diameter of the center conductor is not more than a wire diameter of each of the plural strands of the insulated wire.

16 Claims, 4 Drawing Sheets

COMPOSITE CABLE

CROSS-REFERENCE TO RELATED APPLICATION

The present patent application claims the priority of Japanese patent application No. 2021-158111 filed on Sep. 28, 2021, and the entire contents thereof are hereby incorporated by reference.

TECHNICAL FIELD

The present invention relates to a composite cable with coaxial wires and insulated wires.

BACKGROUND ART

Conventionally, as a composite cable having plural coaxial wires and plural insulated wires (i.e., insulated electric wires), for example, the one described in Patent Literature 1 is known.

The composite cable (multi-core cable) described in Patent Literature 1 includes ten (10) coaxial wires, eight (8) insulated wires, a binder wrapping formed by spirally winding a resin tape around these wires (10 coaxial wires and 8 insulated wires), a shield layer covering around the binder wrapping, and a jacket covering around the shield layer. Each coaxial wire has a center conductor composed of a single wire or twisted wire, a first insulation covering the center conductor, an outer conductor provided on an outer periphery of the first insulation, and a jacket covering the outer conductor. The insulated wire has a jacket covering a conductor composed of plural strands twisted together. The outer diameter (cable diameter) of the entire cable is, for example, 2.0 mm to 6.0 mm, preferably 4.0 mm to 5.0 mm.

CITATION LIST

Patent Literature

Patent Literature 1: JP2019-29262A

SUMMARY OF THE INVENTION

By the way, a composite cable used for an angioscopic catheter (i.e., endovascular endoscopic catheter), for example, is required to have a superfine property such as a cable diameter of 1.0 mm or less and high bending durability. In order to reduce the diameter, it is desirable to use a single wire for the center conductor of the coaxial wire and the conductor of the insulated wire. On the other hand, in order to increase the bending durability, it is desirable to use a twisted wire for the center conductor of the coaxial wire and the conductor of the insulated wire. The inventors of the present application have repeatedly studied to achieve both the superfine properties and bending durability of composite cables and realized a composite cable that can be used in angioscopic catheters, by combining a single wire and a twisted wire so as to meet predetermined conditions.

Therefore, the object of the present invention is to provide a composite cable capable of achieving high bending durability while enabling a reduction in diameter.

To solve the aforementioned problems, one aspect of the present invention provides a composite cable, comprising:
a coaxial wire; and
an insulated wire,
wherein the coaxial wire includes a center conductor, a first insulation covering the center conductor, and plural outer conductors arranged on an outer periphery of the first insulation, and a jacket covering the plural outer conductors,
wherein the insulated wire includes a stranded conductor including plural strands twisted together, and a second insulation covering the stranded conductor,
wherein the center conductor of the coaxial wire is a single wire,
wherein a conductor diameter of the center conductor is not more than a wire diameter of each of the plural strands of the insulated wire.

Effects of the Invention

According to the present invention, it is possible to provide a composite cable capable of achieving high bending durability while enabling a reduction in diameter.

BEST MODE FOR CARRYING OUT THE INVENTION

Embodiment

Figure 1:
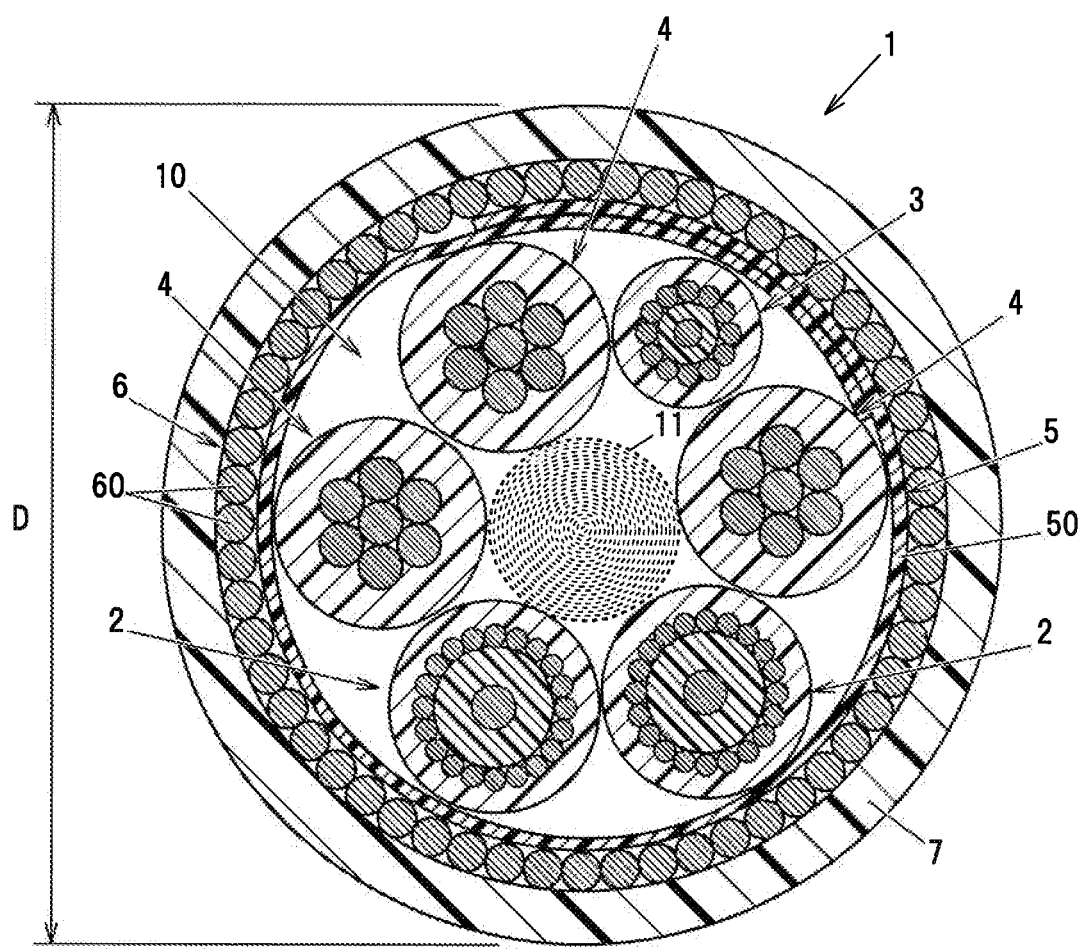
FIG. 1 is a cross-sectional view of a composite cable showing a cross-section perpendicular to a longitudinal direction of the composite cable according to an embodiment of the present invention.

FIG. 1 is a cross-sectional view of a composite cable 1 showing a cross-section perpendicular to a longitudinal direction of the composite cable 1 according to an embodiment of the present invention. This composite cable 1 is configured to be used in an angioscopic catheter, for example, and connects an imaging unit inserted into a blood vessel of a human body and an external device provided outside the human body to perform image processing and the like.

The composite cable 1 includes a cable core 10 including plural coaxial wires 2, 3 and plural insulated wires 4, a filler 11 composed of fibrous members such as aramid fiber, Kevlar (registered trademark), a band-shaped binder tape 50 which is spirally wound around the cable core 10, a shield layer 6 provided on an outer periphery of the tape layer 5, and a sheath 7 composed of a resin. The outer diameter D of the composite cable 1 is, e.g., 1.0 mm or less.

The plural insulated wires 4 are used, for example, as power lines for supplying operating power to a camera of the imaging unit and light-emitting elements for illuminating the object to be imaged by the camera. The plural coaxial wires 2 and 3 are used, for example, as signal lines for transmitting control signals for camera control and image data signals.

The filler 11 is composed of fibrous members bundled into a string, and is placed in the center of the composite cable 1. The plural coaxial wires 2 and 3 and plural insulated wires 4 are provided so as to surround the filler 11 and are helically twisted together. In the present embodiment, the cable core 10 consists of two large-diameter coaxial wires 2, one small-diameter coaxial wire 3, and three insulated wires 4. The large-diameter coaxial wire 2 and the insulated wire 4 have the same outer diameter. The small-diameter coaxial wire 3 is formed to have a smaller outer diameter than the large-diameter coaxial wire 2 and the insulated wire 4.

The binder tape 50 is made of, for example, a resin such as PET (polyethylene terephthalate), and is spirally wound so that parts in the width direction overlap each other. The shield layer 6 is configured by spirally winding plural shield strands 60 made of, for example, a copper alloy. However, the configuration of the shield layer 6 is not limited thereto, and for example, strands may be woven in a grid.

The spiral directions of the plural coaxial wires 2, 3 and the plural insulated wires 4 in the cable core 10 and the spiral direction of the binder tape 50 are opposite to each other. The spiral direction of the binder tape 50 and the spiral direction of the plural shield strands 60 are opposite to each other. According to this configuration, the tendency of the composite cable 1 to bend is suppressed.

The sheath 7 is formed in a tubular shape by extruding a resin around the outer periphery of the shield layer 6. As a material for the sheath 7, for example, a fluorine resin such as PFA (tetrafluoroethylene-perfluoroalkylvinylether copolymer) can be used.

Figure 2A:
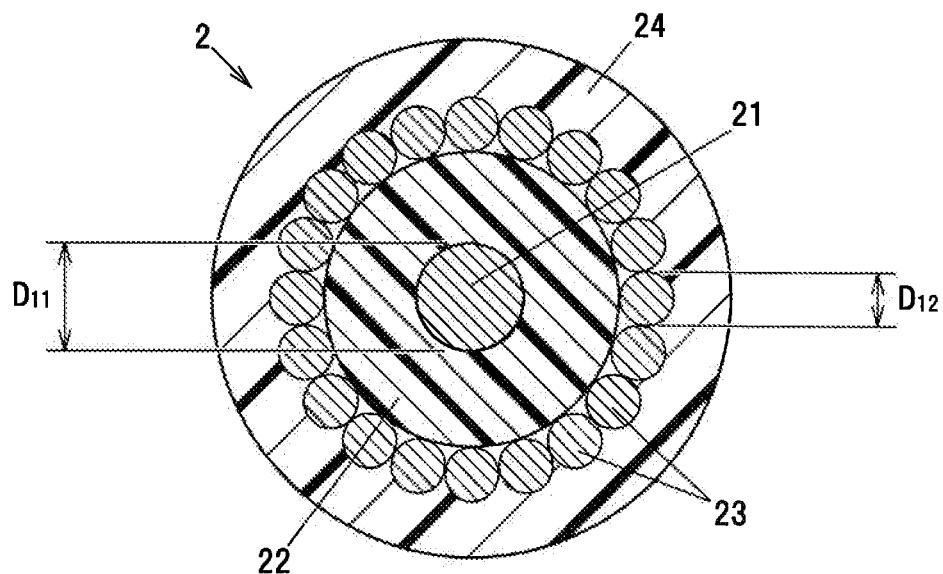
FIG. 2A is an enlarged cross-sectional view of a large-diameter coaxial wire.

FIG. 2A is an enlarged cross-sectional view of one coaxial wire 2 of the two large-diameter coaxial wires 2. The other large-diameter coaxial wire 2 is similarly configured.

The large-diameter coaxial wire 2 has a center conductor 21, an insulation (first insulation) 22 covering the center conductor 21, plural outer conductors 23 provided on the outer periphery of the insulation 22, and a jacket 24 covering the plural outer conductors 23. In the present embodiment, twenty (20) outer conductors 23 are provided on the outer periphery of the insulation 22, and these outer conductors 23 are spirally wound side-by-side around the insulation 22. The insulation 22 and the jacket 24 are made of a fluorine resin such as PFA, and are extruded on the outer periphery of the center conductor 21 and the outer periphery of the outer conductor 23, respectively.

The center conductor 21 and the outer conductors 23 are circular cross-sectional single wires made of, for example, a copper alloy. Here, the single wire refers to a single (solid) conductor formed in a linear shape. As shown in FIG. 2A, when the conductor diameter of the center conductor 21 is $D_{11}$ and the conductor diameter of the outer conductor 23 is $D_{12}$, the value of $D_{12}/D_{11}$ is preferably 0.35 or more and 1.0 or less, more preferably 0.5 or more and 0.85 or less.

Figure 2B:
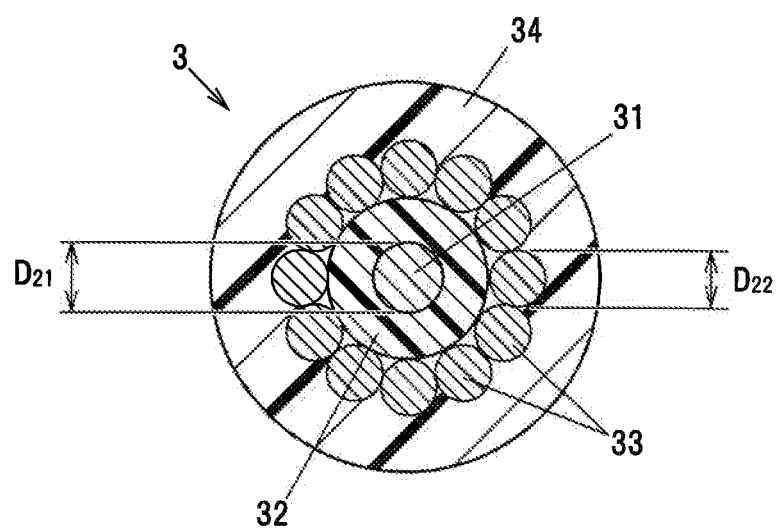
FIG. 2B is an enlarged cross-sectional view of a small-diameter coaxial wire.

FIG. 2B is an enlarged cross-sectional view of the small-diameter coaxial wire 3. The small-diameter coaxial wire 3 has a center conductor 31, an insulation 32 covering the center conductor 31, plural outer conductors 33 provided on the outer periphery of the insulation 32, and a jacket 34 covering the plural outer conductors 33. In the present embodiment, twelve (12) outer conductors 33 are spirally wound side-by-side around the outer periphery of the insulation 32. The insulation 32 and the jacket 34 are made of a fluorine resin such as PFA, and are extruded on the outer periphery of the center conductor 31 and the outer periphery of the outer conductor 33, respectively.

The center conductor 31 and the outer conductors 33 are circular cross-sectional single wires made of, for example, a copper alloy. The center conductor 31 is thinner than the center conductor 21 of the large-diameter coaxial wire 2. The conductor diameter of the outer conductor 33 is equivalent to the conductor diameter of the outer conductor 23 of the large-diameter coaxial wire 2. As shown in FIG. 2B, when the conductor diameter of the center conductor 31 is $D_{21}$ and the conductor diameter of the outer conductor 33 is $D_{22}$, the value of $D_{22}/D_{21}$ is, similarly to the value of $D_{12}/D_{11}$ in the large-diameter coaxial wire 2, preferably 0.35 or more and 1.0 or less, more preferably 0.5 or more and 0.85 or less.

Figure 3:
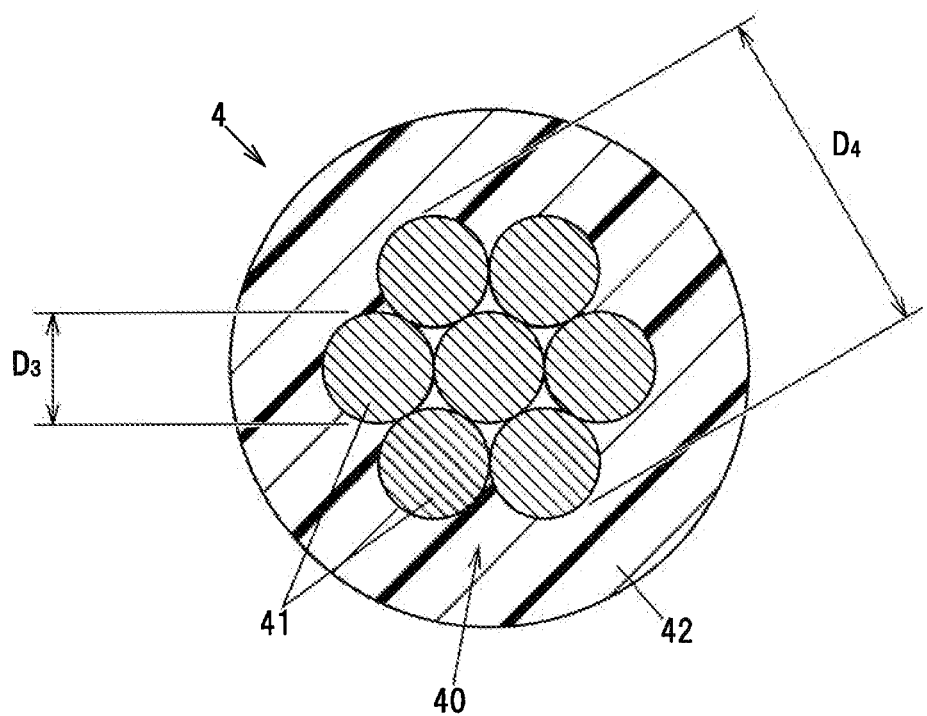
FIG. 3 is an enlarged cross-sectional view of an insulated wire.
Figure 4:
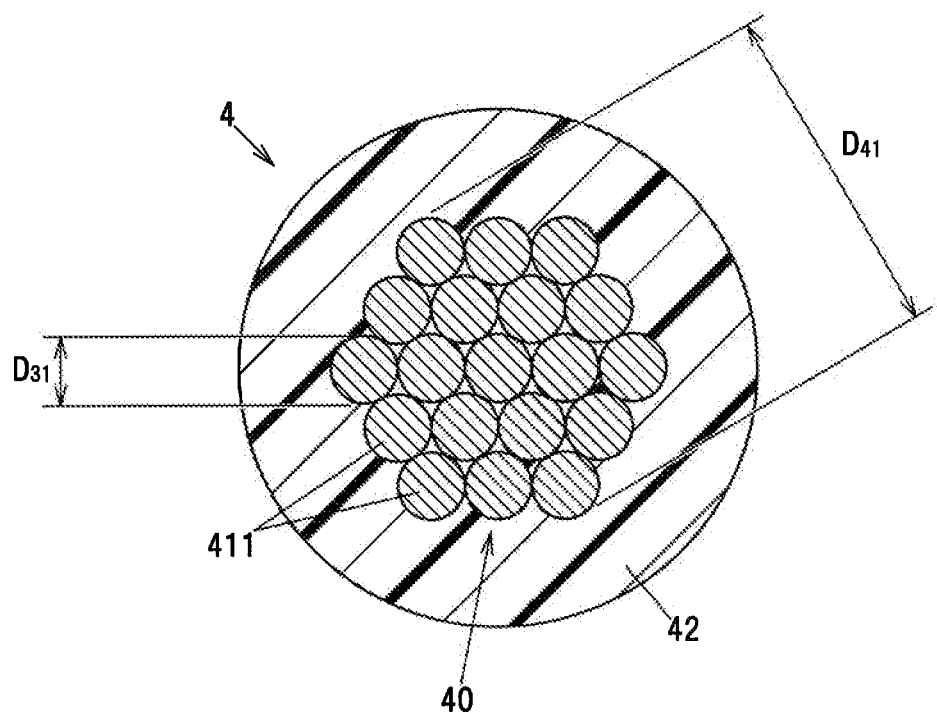
FIG. 4 is an enlarged cross-sectional view of an insulated wire according to a modified example.

FIG. 3 is an enlarged cross-sectional view of one of the three insulated wires 4. In addition, other insulated wires 4 are similarly configured.

The insulated wire 4 is composed of a stranded conductor 40 formed by twisting plural strands (i.e., elementary wires) 41 and an insulative coating (second insulation) 42 covering the stranded conductor 40. The strand 41 is made of a copper alloy, for example. The insulative coating 42 is made of a fluorine resin such as PFA, and is extruded around the outer periphery of the stranded conductor 40. In the present embodiment, the stranded conductor 40 is configured by twisting seven (7) strands 41 each having a circular cross-section.

When that the wire diameter of the strand 41 of the insulated wire 4 is $D_3$, the conductor diameter $D_{11}$ of the center conductor 21 of the large-diameter coaxial wire 2 is not more than the wire diameter $D_3$ of the strand 41 and not less than half of the wire diameter $D_3$ of the strand 41. That is, the value of $D_{11}/D_3$ is 0.5 or more and 1.0 or less. Also, the conductor diameter $D_{11}$ of the center conductor 21 of the large-diameter coaxial wire 2 is 0.05 mm or less.

When the conductor cross-sectional area, which is the total cross-sectional area, of the center conductor 21 and the plural outer conductors 23 in the large-diameter coaxial wire 2 is $S_1$, and the conductor cross-sectional area, which is the total cross-sectional area, of the plural strands 41 of the stranded conductor 40 in the insulated wire 4 is $S_2$, if the value of $S_2/S_1$ is too large, stress tends to concentrate on the insulated wire 4 when the composite cable 1 is bent. Also, if the value of $S_2/S_1$ is too small, the stress tends to concentrate on the large-diameter coaxial wire 2. A desirable range of the value of $S_2/S_1$ is 0.6 or more and 4.5 or less, more preferably 1.0 or more and 3.0 or less.

In the present embodiment, the number of outer conductors 23 in the large-diameter coaxial wire 2 is twenty (20), so the conductor cross-sectional area $S_1$ of the large-diameter coaxial wire 2 is obtained by an equation $S_1=((D_{11}/2)^2+(D_{12}/2)^2 \times 20) \times \pi$. Also, the conductor cross-sectional area $S_2$ of the insulated wire 4 is obtained by an equation $S_2=(D_3/2)^2 \times 7 \times \pi$.

By the way, in a composite cable with plural wires (coaxial wires and insulated wires), the thickness and configuration of the conductors that make up each wire affect the bending durability. For example, between single wires with different wire diameters, the wire with the larger diameter is more likely to generate a larger bending stress and more likely to break. In addition, between a single wire and a twisted wire obtained by twisting plural strands having the same wire diameter as the single wire, the single wire is more likely to break. The upper and lower limits of each numerical range above are set in consideration of the above circumstances, in order to prevent stress from concentrating on a part of the conductor and causing breakage when the composite cable 1 is bent.

For example, if the conductor diameter $D_{11}$ of the center conductor 21 of the large-diameter coaxial wire 2 is larger than the wire diameter $D_3$ of the strand 41 of the insulated wire 4, when the composite cable 1 is bent, the stress concentrates on the center conductor 21, making breakage more likely. On the other hand, if the wire diameter $D_3$ of the strand 41 of the insulated wire 4 is twice as large as the conductor diameter $D_{11}$ of the center conductor 21, the strand 41 is likely to break.

Also, if the difference between the conductor cross-sectional area $S_1$ of the large-diameter coaxial wire 2 and the conductor cross-sectional area $S_2$ of the insulated wire 4 is too large, the wire with the larger conductor cross-sectional area is likely to break. In the present embodiment, the insulated wire 4 is used as the power supply line, and the desirable numerical range of $S_2/S_1$ is set as described above, taking into consideration that the required current capacity is relatively large. In addition, since bending stress is less likely to act on the small-diameter coaxial wire 3 than on the large-diameter coaxial wire 2, the conductor cross-sectional area $S_1$ of the large-diameter coaxial wire 2 is compared with the conductor cross-sectional area $S_2$ of the insulated wire 4 here.

Also, in the large-diameter coaxial wire 2, the outer conductor 23 has a larger number than the center conductor 21, so the conductor diameter $D_{12}$ of the outer conductor 23 may be less than the conductor diameter $D_{11}$ of the center conductor 21. However, if the conductor diameter $D_{12}$ of the outer conductor 23 is too small, the manufacturing difficulty increases, so the desirable numerical range of $D_{12}/D_{11}$ is set as described above. The same applies to the small-diameter coaxial wire 3 as well.

EXAMPLE

As an example, the conductor diameter $D_{11}$ of the center conductor 21 of the large-diameter coaxial wire 2 is 0.04 mm corresponding to 46 AWG (American wire gauge), and the conductor diameter $D_{21}$ of the center conductor 31 of the small-diameter coaxial wire 3 is 0.025 mm corresponding to 50 AWG. The conductor diameters $D_{12}$, $D_{22}$ of the outer conductors 23, 33 of the large-diameter and small-diameter coaxial wires 2, 3 are 0.02 mm. The wire diameter $D_3$ of the strand 41 of the insulated wire 4 is 0.04 mm corresponding to 46 AWG, and the conductor diameter $D_4$ of the stranded conductor 40 is 0.12 mm corresponding to 38 AWG (three times the wire diameter $D_3$ of the strand 41).

The composite cable 1 in which each conductor diameter and wire diameter were set in this way achieved high bending durability.

Specifically, instead of the stranded conductor 40 of the insulated wire 4, a single wire having the same cross-sectional area as the cross-sectional area of the stranded conductor 40 (cross-sectional area of strand 41×7) was used to perform the bending endurance test. In this case, the single wire was broken at about 4000 flexion times. On the other hand, in the composite cable 1 with each conductor diameter and wire diameter set as described above, no wire breakage occurred even when the number of bends exceeded the number of bends that caused wire breakage when using the single wire with the cross-sectional area same as the cross-sectional area of the stranded conductor 40. As a result, high bending durability that meets the required specifications as a composite cable for angioscopic catheters was obtained.

The conductor diameters $D_{11}$ and $D_{21}$ of the center conductors 21 and 31 of the large-diameter and small-diameter coaxial wires 2 and 3 can be set, for example, between 0.021 mm corresponding to 52 AWG and 0.064 mm corresponding to 42 AWG. Also, the conductor diameter $D_4$ of the stranded conductor 40 of the insulated wire 4 can be set, for example, between 0.06 mm corresponding to 44 AWG and 0.24 mm corresponding to 32 AWG.

Effects of the Embodiment

According to the present embodiment described above, when the composite cable 1 is bent, it is possible to suppress stress concentration on either the center conductors 21 and 31 of the large-diameter and small-diameter coaxial wires 2 and 3 or one or more of the plural strands 41 of the insulated wire 4. Therefore, it is possible to achieve high bending durability while making it possible to reduce the diameter of the composite cable 1.

In the embodiment described above, the case where the configuration of the plural insulated wires 4 is the same has been explained. However, in the case of a composite cable having plural insulated wires with different conductor cross-sectional areas, which is the total value of the cross-sectional areas of the plural strands, the value ($S_2/S_1$) obtained by dividing the conductor cross-sectional area $S_2$ of the insulated wire with the largest conductor cross-sectional area by the conductor cross-sectional area $S_1$ of the coaxial wire with the largest conductor cross-sectional area (in the present embodiment, the large-diameter coaxial wire 2) should be within the above numerical range.

Regarding the ratio of the conductor diameter of the outer conductor to the conductor diameter of the center conductor in the coaxial wire, the ratio (the conductor diameter of the outer conductor/the conductor diameter of the center conductor) in the coaxial wire with the largest conductor diameter of the center conductor (in the present embodiment, the large-diameter coaxial wire 2) should be within the above numerical range.

Summary of Embodiment

Next, technical ideas understood from the embodiments described above will be described with reference to the reference numerals and the like in the embodiments. However, each reference numeral in the following description does not limit the constituent elements in the claims to the members and the like specifically shown in the embodiment.

According to the feature [1], a composite cable 1 includes a coaxial wire 2, 3 and an insulated wire 4, wherein the coaxial wire 2, 3 includes a center conductor 21, 31, an insulation 22, 32 covering the center conductor 21, 31, and plural outer conductors 23, 33 arranged on an outer periphery of the insulation 22, 32, and a jacket 24, 34 covering the plural outer conductors 23, 33. The insulated wire 4 includes a stranded conductor 40 including plural strands 41 twisted together, and an insulative coating (second insulation) 42 covering the stranded conductor 40. The center conductor 21, 31 of the coaxial wire 2, 3 is a single wire. A conductor diameter $D_{11}$, $D_{21}$ of the center conductor 21, 31 is not more than a wire diameter $D_3$ of each of the plural strands 41 of the insulated wire 4.

According to the feature [2], in the composite cable 1 as described by the feature [1], the conductor diameter $D_{11}$, $D_{21}$ of the center conductor 21, 31 is not less than half of the wire diameter $D_3$ of each of the plural strands 41 of the insulated wire 4.

According to the feature [3], in the composite cable 1 as described by the feature [1] or [2], the conductor diameter $D_{11}$, $D_{21}$ of the center conductor 21, 31 is 0.064 mm or less.

According to the feature [4], in the composite cable 1 as described by any one of the features [1] to [3], when a total cross-sectional area of the center conductor 21, 31 and the plural outer conductors 23, 33 is $S_1$, and a total cross-sectional area of the plural strands 41 in the stranded conductor 40 is $S_2$, a value of $S_2/S_1$ is 0.6 or more and 4.5 or less.

According to the feature [5], in the composite cable 1 as described by the feature [4], the value of $S_2/S_1$ is 1.0 or more and 3.0 or less.

According to the feature [6], in the composite cable 1 as described by any one of the features [1] to [5], when the conductor diameter of the center conductor 21 is $D_1$ and a conductor diameter of each of the plural outer conductors 23 is $D_2$, a value of $D_2/D_1$ is 0.35 or more and 1.0 or less.

According to the feature [7], in the composite cable 1 as described by the feature [6], wherein the value of $D_2/D_1$ is 0.5 or more and 0.85 or less.

Although the embodiments of the present invention have been described above, the embodiments described above do not limit the invention according to the scope of claims. Also, it should be noted that not all combinations of features described in the embodiments are essential to the means for solving the problems of the invention.

Moreover, the present invention can be modified appropriately without departing from the gist thereof. For example, in the embodiment described above, the composite cable 1 has two large-diameter coaxial wires 2, one small-diameter coaxial wire 3, and three insulated wires 4, but the number of coaxial wires and insulated wires can be changed as appropriate. Further, the application of the composite cable is not limited to the angioscopic catheters, and can be used for various applications that require a small diameter and resistance to bending.

Further, in the embodiment described above, the stranded conductor 40 of the insulated wire 4 is configured by twisting seven (7) strands 41, but the number of strands of the insulated wire is not limited to seven. Alternatively, the stranded conductor 40 of the insulated wire 4 may be constructed by twisting nineteen (19) strands 411 together. In this case, by setting a wire diameter $D_{31}$ of the strand 411 to 0.05 mm (the conductor diameter $D_{41}$ of the stranded conductor 40 is 0.25 mm), the stranded conductor 40 corresponding to 32 AWG can be obtained.

The invention claimed is:

1. A composite cable, comprising:
    plural coaxial wires; and
    plural insulated wires,
    wherein each of the plural coaxial wires includes a center conductor, a first insulation covering the center conductor, and plural outer conductors arranged on an outer periphery of the first insulation, and a jacket covering the plural outer conductors,
    wherein each of the plural insulated wires includes a stranded conductor including plural strands twisted together, and a second insulation covering the stranded conductor,
    wherein the center conductor of each of the plural coaxial wires is a single wire,
    wherein a conductor diameter of each center conductor is not more than a wire diameter of each of the plural strands of at least one of the plural insulated wires,
    wherein the plural coaxial wires comprise one or more large-diameter coaxial wires and one or more small-diameter coaxial wires,
    wherein a conductor diameter of the center conductor of the one or more large-diameter coaxial wires is smaller than a wire diameter of each strand of each of the plural insulated wires.

2. The composite cable, according to claim 1, wherein the conductor diameter of the center conductor is not less than half of the wire diameter of each of the plural strands of the insulated wire.

3. The composite cable, according to claim 1, wherein the conductor diameter of the center conductor is 0.064 mm or less.

4. The composite cable, according to claim 1, wherein when the conductor diameter of the center conductor is $D_1$ and a conductor diameter of each of the plural outer conductors is $D_2$, a value of $D_2/D_1$ is 0.35 or more and 1.0 or less.

5. The composite cable, according to claim 4, wherein the value of $D_2/D_1$ is 0.5 or more and 0.85 or less.

6. The composite cable according to claim 1, wherein $S_1$ is a total cross-sectional area of the center conductor and the plural outer conductors of the one or more large-diameter coaxial wires.

7. The composite cable according to claim 1, wherein a conductor diameter of the outer conductor of the one or more large-diameter wires is the same as a conductor diameter of the outer conductor of the one or more small-diameter wires.

8. The composite cable according to claim 1, wherein the one or more small-diameter coaxial wires comprise the center conductor being thinner than the center conductor of the one or more large-diameter coaxial wires.

9. The composite cable according to claim 1, comprising the large-diameter coaxial wires having a same outer diameter, and the small-diameter coaxial wires having a smaller diameter than the plurality of large-diameter coaxial wires.

10. The composite cable according to claim 1, wherein a conductor diameter of the outer conductor of the small-diameter coaxial wire is substantially a same as a conductor diameter of the outer conductor of the large-diameter coaxial wire.

11. The composite cable according to claim 1, wherein the plural coaxial wires are separate from the plural insulated wires.

12. The composite cable according to claim 1, further comprising a filler placed in a center of the composite cable, wherein the plural coaxial wires and the plural insulated wires are provided to surround the filler.

13. A composite cable, comprising: plural coaxial wires; and plural insulated wires, wherein each of the plural coaxial wires includes a center conductor, a first insulation covering the center conductor, and plural outer conductors arranged on an outer periphery of the first insulation, and a jacket covering the plural outer conductors, wherein each of the plural insulated wires includes a stranded conductor including plural strands twisted together, and a second insulation covering the stranded conductor, wherein the center conductor of each of the plural coaxial wires is a single wire, wherein a conductor diameter of the center conductor is not more than a wire diameter of each of the plural strands of at least one of the plural insulated wires, wherein the plural coaxial wires comprise one or more large-diameter coaxial wires and one or more small-diameter coaxial wires, wherein when a total cross-sectional area of the center conductor and the plural outer conductors is $S_1$, and a total cross-sectional area of the plural strands in the stranded conductor is $S_2$, a value of $S_2/S_1$ is 0.6 or more and 4.5 or less, wherein $S_1$ is the total cross-sectional area of the center conductor and the plural outer conductors of the one or more large-diameter coaxial wires.

14. The composite cable, according to claim 13, wherein the value of $S_2/S_1$ is 1.0 or more and 3.0 or less.

15. The composite cable according to claim 13, wherein a conductor diameter of the center conductor of the one or more large-diameter coaxial wires is smaller than a wire diameter of a strand of each of the plural insulated wires.

16. The composite cable according to claim 15, wherein a conductor diameter of the outer conductor of the one or more large-diameter wires is the same as a conductor diameter of the outer conductor of the one or more small-diameter wires.

* * * * *